LAWRENCE & COLLAMORE.
Pan Lifter.
No. 116,330.                          Patented June 27, 1871.
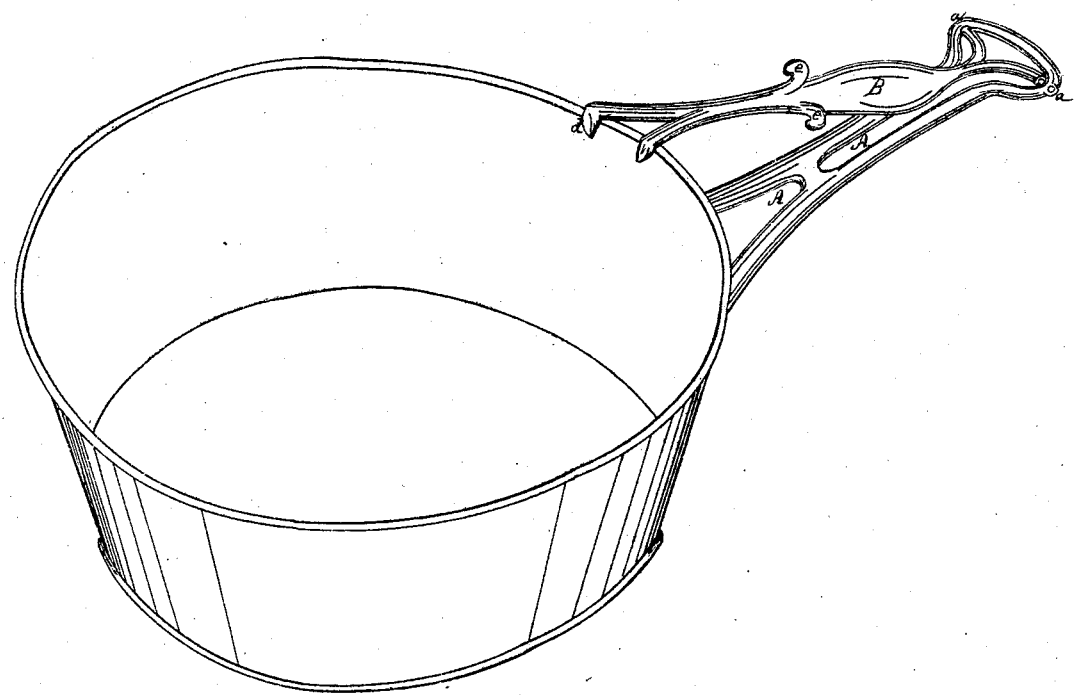
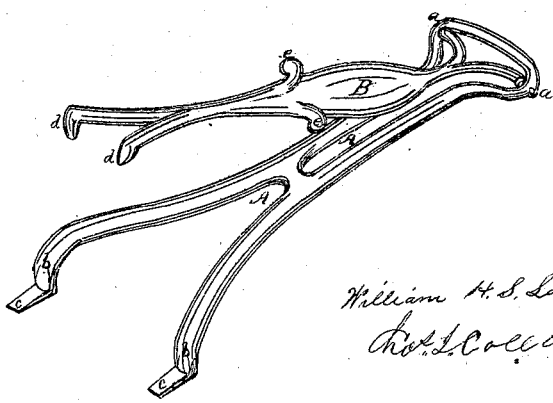

UNITED STATES PATENT OFFICE.

WILLIAM H. S. LAWRENCE AND CHARLES I. COLLAMORE, OF BANGOR, MAINE.

IMPROVEMENT IN PAN-LIFTERS.

Specification forming part of Letters Patent No. 116,330, dated June 27, 1871.

*To all whom it may concern:*

Be it known that we, WILLIAM H. S. LAWRENCE and CHARLES I. COLLAMORE, both of the city of Bangor, in the county of Penobscot and State of Maine, have invented or produced a new article of manufacture which we have denominated the Pan-Lifter; and we do declare that the following is a full description of the same:

The object of our invention is to furnish to cooks and others employed about cooking-stoves a convenient article for removing hot, smutty, or greasy pans, whether round or square, from ovens and stoves. It may also, if desirable, be used for other purposes about a cooking-stove, such as lifting stove-covers when the ordinary stove-cover hook is not at hand.

The want of a more suitable appliance for removing hot dishes from the stove than the common stove-towel has long been felt by those whose duty it is to work about cooking-stoves. By the use of the towel the hands of the user are frequently getting burned, and, without a very careful adjustment of the towel, the corners and loose folds are liable to drop upon and into the contents of the pan or dish to be lifted. By the use of lifters as heretofore made, to gripe the pan only at a single point at its top and bottom, large pans and vessels, especially when containing much liquid, cannot be safely handled, there being constant danger of tilting the pan, dropping or spilling its contents, or of scalding the cook. This danger is yet greater when the vessels are round, and still greater if they be large and their contents very heavy; in fact, any lifter in use known to us is in such case worse than useless. The arms of the handle ought also to be so connected that, in their normal condition, the top one will drop by gravity toward the other, so that they may clasp the vessel by their own action, and not, as they have been heretofore made, arranged so as to separate from each other by the force of a spring, for, in the latter mode of construction, a slight relaxation of the grasp would allow the vessel to drop instantly. Therefore it is to supply this want that constitutes principally the object of our invention; and the nature of our invention of the new article of manufacture consists in making, of iron or other suitable metal, a two-pronged lever, with the ends of the prongs flattened to run under the pan to be lifted, and with a shoulder on the upper side of the lever, a short distance from the ends of the prongs, to prevent the pan from sliding back on the lever toward the hands, as well as to help hold the cant of the pan. And to this lever, at or near the end opposite the pronged end, is attached an arm or clasp, so as to form a hinge at the point of connection, the arm or clasp opening upward. The arm or clasp extends out to the shoulders on the lever, and on the end opposite to where it is joined by hinge to the lever are two short prongs, the ends of which are turned down, forming a hook or hooks, for the purpose of hooking downward over the upper and inner edge of the pan so as to hold firmly the cant of the pan, and, in conjunction with the weight of the pan, to hold the pan on the prongs and against the shoulders of the lever. It will be obvious that the lever might be made of one flat piece of metal without prongs if only square pans were to be lifted by it. Such a device would not be suitable for lifting round pans, and we do not claim it as our invention.

The mode of applying the lifter to the pan to be removed is to first push the flattened ends of the prongs on the lever under the pan till the shoulders touch against the side of the pan; then hook the arm or clasp over the upper edge of the pan in manner as above described; then clasp the hand (or hands, if the pan be heavy) around under the lever and over the arm or clasp, in which manner the heaviest pans used in cooking may be conveniently removed. But to describe our invention more particularly, we refer to the accompanying drawings forming a part of this specification, the same letters of reference, wherever they occur, referring to like parts.

The drawings are in perspective. Figure 1 represents the lifter attached to a round pan, the shoulders and flattened ends of the lever A being hid by the pan. Fig. 2 is a full representation of the lifter with the arm or clasp B opened as it is held when it is being attached to a pan.

*a a* represent the hinge connecting the arm to the lever. *b b* represent the shoulders near the pronged ends of the lever. *c c* represent the flattened ends of the prongs on the lever. *d d* represent the hooks on the ends of the short prongs on the arm or clasp. *e e* represent nibs or slight projections on either side of the arm or clasp, under which the thumb or finger of the operator may be placed for the purpose of raising or opening the arm or clasp.

It will be seen that the arm B, as arranged, acts as a weight, so that when applied to the pan or vessel it will clasp it by reason of its own gravity, and thus the implement will retain its gripe by its own action, even when the grasp is relaxed or entirely taken off. Hence there is no risk of its parting with its laden vessel at any time; and when the cook grasps the lifter this gripe on the vessel becomes still tighter, and, in connection with the double hold which both the upper and lower arms take, prevents any tilting or swaying of the vessel downward at either side of the point of griping, a difficulty which is unavoidable when a circular vessel is held only at single points.

The simplicity of our construction is evident, and there are no springs or parts liable to get out of order.

We do not claim anything shown in the patent of E. Reynolds, dated December 27, 1864; but

We claim as our invention—

The pan-lifter, constructed with an arm having forked shouldered under jaws, and with a gravitating forked clasp swinging on the arm, substantially as described.

WM. H. S. LAWRENCE.
CHAS. I. COLLAMORE.

Witnesses:
ALBERT P. BAKER,
FRANK A. CURTIS.